Figure 1:
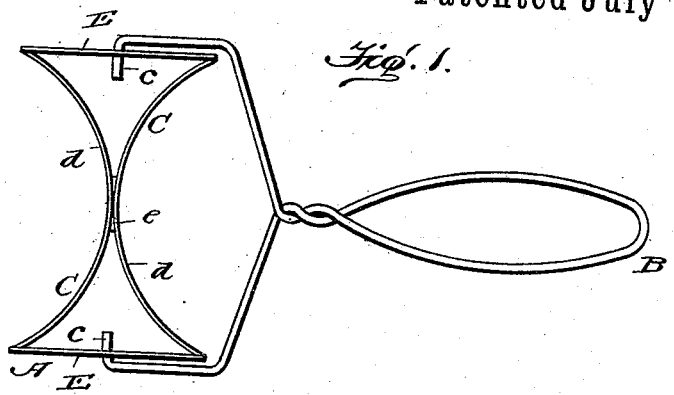

(Model.)

T. B. STONE.
CAKE OR BISCUIT CUTTER.

No. 501,903. Patented July 18, 1893.

WITNESSES:

INVENTOR
T. B. Stone
BY
ATTORNEYS.

UNITED STATES PATENT OFFICE.

THOMAS BENTON STONE, OF CAMPTOWN, PENNSYLVANIA, ASSIGNOR OF TWO-THIRDS TO CLARENCE C. SMITH AND PRESCOTT A. SMITH, OF SAME PLACE.

CAKE OR BISCUIT CUTTER.

SPECIFICATION forming part of Letters Patent No. 501,903, dated July 18, 1893.

Application filed January 28, 1893. Serial No. 460,087. (Model.)

*To all whom it may concern:*

Be it known that I, THOMAS BENTON STONE, a citizen of the United States, residing at Camptown, in the county of Bradford and State of Pennsylvania, have invented certain new and useful Improvements in Cake or Biscuit Cutters; and I do hereby declare the following to be a full, clear, and exact description of the invention, such as will enable others skilled in the art to which it appertains to make and use the same.

My invention relates to an improved cake or biscuit cutter of that class which employes a rotatable cutter journaled in a suitable bail or handle and adapted to turn freely on its axis as it is pressed and forced through the sheet of dough to cut out the cakes or biscuits therefrom.

In constructing devices of the class to which my invention appertains, it has been proposed to make the cutter of two elliptical plates of metal which are placed back to back, suitably united together, and provided at their ends with transverse bars which have the ends of the bail loosely connected to the same at about the longitudinal axis of the cutter to enable the latter to turn freely on its axis.

Practical experience with a cutter consisting of the two elliptical plates arranged back to back or reversely to each other has demonstrated that it does not act efficiently in cutting as the edges of the plates do not cut vertically, but obliquely, through the dough and the plates are liable to "bed down" into the dough, particularly if the sheet of dough happens to be a little thicker than usual, and thereby cause the dough to adhere to the faces of the plates and to be carried around with the cutter. Again, the cutter is liable to clog up with the dough thus requiring the operator to stop cutting the dough and clean the plates, forming the cutter, of the adhering dough, which is not an easy matter owing to the limited space and peculiar form of the cutter.

The object of my invention is to construct a dough cutter of novel form which will obviate these objections and which, in operation, will cut the dough cleanly and clear through the sheet without liability of the parts clogging up by the dough adhering thereto.

With these ends in view, my invention consists of a skeleton cutter formed of two (or more) rings of wire which are bent or curved and joined together at their contiguous sides and form a true skeleton cylinder, transverse end stays situated at the ends of the skeleton cutter and rigid with the wire rings, a central transverse stay joined to the rings at the points where they are connected together, and a bail or handle having trunnions which are fitted centrally in the transverse end stays, all as will be hereinafter more fully described and pointed out in the claims.

The accompanying drawings fully illustrate my invention, in which—

Figure 2:
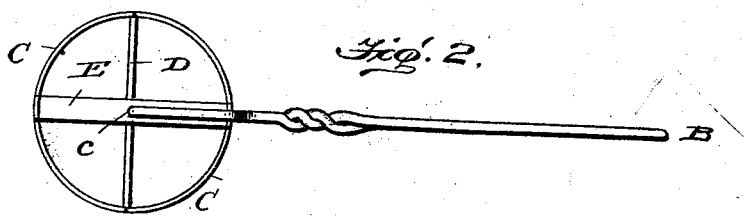
Figure 3:
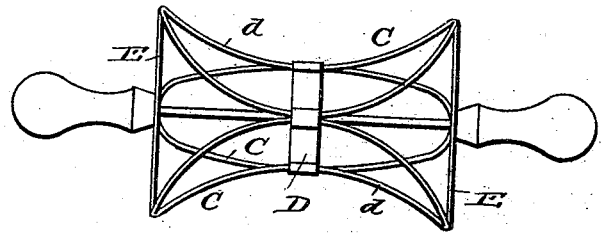
Figure 4:
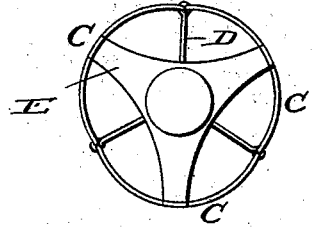

Figures 1 and 2 are respectively a plan and end elevation of any revoluble cake cutter constructed of two rings, and Figs. 3 and 4 are respectively a plan and end elevation of the cake cutter composed of three rings.

Like letters of reference denote corresponding parts in all the figures of the drawings, referring to which—

A designates the skeleton cutter, and B is the bail having the trunnions *c, c*, bent from a single piece of wire although a wooden sheath may be fastened to the shank of the bail, if desired.

In making the skeleton cutter, 1 first take two pieces of wire of suitable length and form or bend them into rings, C, C, the ends of which wires are suitably united together. The wire rings are then recurved or bent backwardly upon each other, as at *d*, and these recurved parts of the rings are united rigidly together at the points, *e, e* by solder or other equivalent fastening. By thus shaping and fastening the ring I produce a cutter of skeleton outline in which the cutter edges are formed of wire which has been found by practical experiments to be very successful in operation as the wires cut clear through the sheet of dough in a very clean manner.

The center of the wire skeleton cutter is stayed by the transverse central stay D which has its ends fastened to the wire rings forming the cutter at the points, *e, e*, where said rings are joined together; and the ends of the cylinder are braced by the transverse end stays E, E, which are suitably fastened to the rings at the ends of the cylindrical skeleton cutter. In these transverse end stays are formed eyes or openings in which are fitted the trunnions c of the bail, and the cutter is thus connected to the bail so that it can turn or rotate freely on its longitudinal axis.

In operation, the cutter is placed upon the sheet of dough and shoved or forced over the same, and owing to the frictional resistance between the cutter and dough the skeleton cylinder is caused to turn or rotate on its axis, thus causing the wire cutter to cut cleanly through the dough in vertical lines and cut the cakes or biscuits in disk form.

My improved cutter will cut easily through a sheet of dough even if it happens to be thicker than usual, and as only very thin narrow cutting surfaces are presented, the dough will not adhere to the cutter and clog up the implement.

In Figs. 3 and 4 of the drawings I have shown a cutter formed of three rings of wire. In this embodiment of my invention, I make three rings of wire and recurve or bend the same on opposite sides, after which the rings are arranged in approximately cylindrical form and united together at their contiguous edges. The stays at the ends of the cutter are each made in the form of a spider with a central hub and three radial arms, and the outer ends of these arms are fastened to the rings at the ends of the cutter. The central stay is also made with a hub and three radial arms, the latter being fastened to the rings at the points where they are joined together. In this form of the cutter, a transverse shaft is used which has suitable handles at its ends. The end and central stays of the cutter cylinder are loosely journaled or fitted on the shaft so that the cutter can rotate freely thereon when the implement is forced by the operator over the sheet of dough in a manner similar to the well known rolling pin; but it is evident that the cutter cylinder can be made fast with the shaft and the parts adapted to rotate together, while the hand pieces can be fitted loosely on the ends of the shaft.

Having thus described my invention, what I claim as new, and desire to secure by Letters Patent, is—

1. In a cake or biscuit cutter, substantially such as herein shown and described, the revoluble skeleton cutter comprising a series of cutter-rings each bent or curved to a segment of a circle in side view and the transverse end and middle braces fastened respectively to the sides of the ring cutters and to the middle thereof where the curved parts of said ring cutters meet each other, in combination with a suitable handle in which the revoluble cutter is loosely journaled, as set forth.

2. A cake or biscuit cutter, substantially such as herein shown and described, comprising a suitable bail having the trunnions, the skeleton cutter-cylinder formed of wire rings bent or recurved backward upon themselves and united together, at e, the transverse end stays joined to the ends of the cutter-cylinder and having the trunnions of the bail fitted centrally thereto, and the transverse central stay joined to the wire rings at the points, e, where they are joined to each other, substantially as set forth.

In testimony whereof I affix my signature in presence of two witnesses.

THOMAS BENTON STONE.

Witnesses:
C. C. SMITH,
H. F. SMITH.